(12) United States Patent
Sampson

(10) Patent No.: US 10,668,878 B1
(45) Date of Patent: Jun. 2, 2020

(54) WRAP BRACKET WITH ATTACHED PUSH-ON NUT

(71) Applicant: FRANKLIN FASTENER COMPANY, Redford, MI (US)

(72) Inventor: James M. Sampson, Southfield, MI (US)

(73) Assignee: FRANKLIN FASTENER COMPANY, Redford, MI (US)

( * ) Notice: Subject to any disclaimer, the term of this patent is extended or adjusted under 35 U.S.C. 154(b) by 0 days.

(21) Appl. No.: 16/271,495

(22) Filed: Feb. 8, 2019

(51) Int. Cl.
| | |
|---|---|
| *F16L 3/08* | (2006.01) |
| *B60R 16/08* | (2006.01) |
| *F16B 2/08* | (2006.01) |
| *F16L 3/123* | (2006.01) |

(52) U.S. Cl.
CPC ............... *B60R 16/08* (2013.01); *F16B 2/08* (2013.01); *F16L 3/1233* (2013.01)

(58) Field of Classification Search
CPC ........ F16B 21/20; F16B 37/0842; F16B 2/08; B60R 16/08; F16L 3/137; F16L 3/1233
USPC ................ 248/74.3; 24/16 PB; 411/525, 526
See application file for complete search history.

(56) References Cited

U.S. PATENT DOCUMENTS

| | | | | |
|---|---|---|---|---|
| 6,508,442 B1 * | 1/2003 | Dolez | ................... | F16L 3/1233 248/230.9 |
| 6,700,064 B2 * | 3/2004 | Aoki | .................. | B60R 16/0215 174/69 |
| 7,645,107 B2 * | 1/2010 | Yoneoka | ............. | F16B 37/0857 411/433 |
| 8,210,786 B2 * | 7/2012 | Okada | ..................... | F16B 37/02 411/437 |
| 8,342,460 B2 * | 1/2013 | Binkert | ............... | F16B 19/1081 248/71 |
| 9,062,800 B2 * | 6/2015 | Sampson | ................. | F16L 3/137 |
| 9,222,602 B2 * | 12/2015 | Dworak, Jr. | .......... | F16L 3/1075 |
| 9,656,622 B2 * | 5/2017 | Lee | ....................... | H02G 3/0431 |
| 10,174,774 B2 * | 1/2019 | Hiramoto | .................. | F16B 2/20 |
| 2007/0257161 A1 * | 11/2007 | Geppert | ................ | F16L 3/1233 248/74.3 |

FOREIGN PATENT DOCUMENTS

| | | |
|---|---|---|
| CN | 105387280 | 12/2017 |
| DE | 102006003448 | 4/2007 |

* cited by examiner

*Primary Examiner* — Todd M Epps
(74) *Attorney, Agent, or Firm* — Brooks Kushman P.C.

(57) ABSTRACT

A wrap bracket assembly includes a clamp and a push-on nut. The clamp includes a first attachment flange defining a first attachment opening, a second attachment flange defining a second attachment opening. A loop portion is disposed between the first attachment flange and the second attachment flange. The push-on nut defines a receptacle opening having teeth that extend radially inwardly and partially extend across the first attachment opening. The push-on nut includes an outer leg and an inner leg that are clipped to the first attachment flange in an open position. The crimp tab is bent over the second attachment flange to hold the first and second attachment flanges together in a closed position.

13 Claims, 2 Drawing Sheets

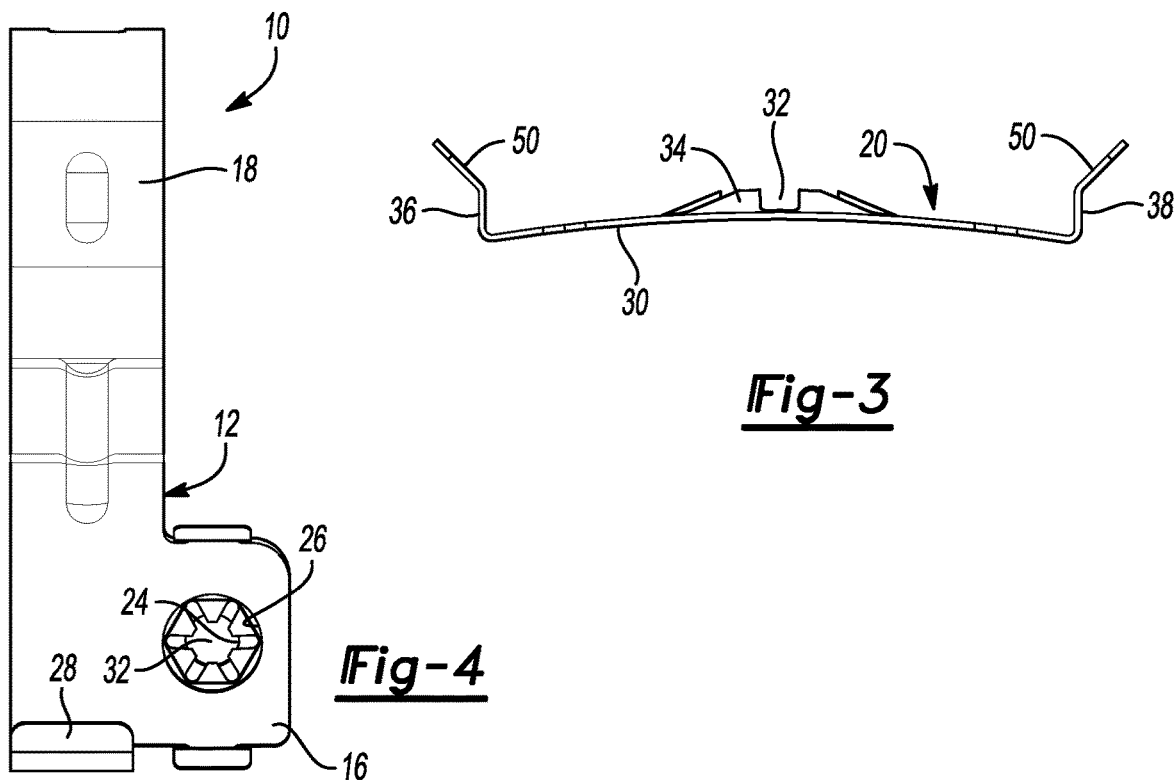
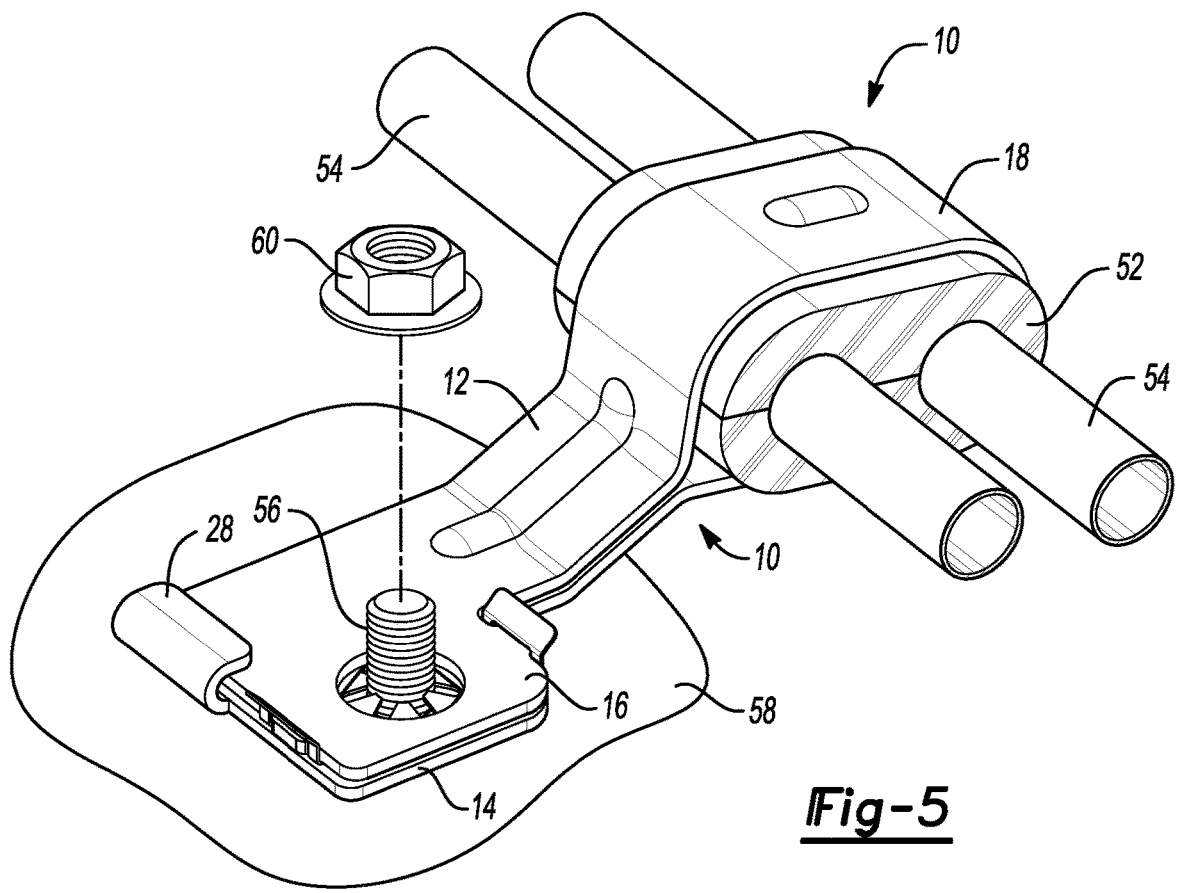

WRAP BRACKET WITH ATTACHED PUSH-ON NUT

TECHNICAL FIELD

This disclosure relates to wrap brackets used to attached elongated members such as tubes, hoses, or the like to a supporting surface on a vehicle.

BACKGROUND

Wrap brackets are specialized connectors that are used to secure tubes or hoses to vehicles such as an engine, transmission, frame, body part or any other part of the vehicle. Examples of parts that may be attached with wrap brackets include but are not limited to fuel lines, brake lines, hydraulic hoses, vacuum lines, coolant tubes, HVAC lines, and the like.

One problem with wrap brackets is that they may include one or more clamp parts and a grommet that either must be assembled on an assembly line or may be shipped preassembled as part of a parts-in-assembly (PIA). PIA refers to subassemblies that are supplied to an assembly line that include one or more parts and associated brackets and connectors. Wrap brackets are assembled over elongated lines or tubes by opening the bracket and assembling a grommet into the bracket and around the line or tube either as a PIA subassembly off-line or may be assembled on the assembly line. While this approach is effective in many applications, in some applications there is a need to temporarily attach the wrap bracket assembly to the vehicle as an assembly aid before the bracket is permanently secured to the vehicle.

A wrap bracket may be required to be preassembled as part of a PIA to a vehicle on an assembly line. The PIA may be unwieldy and difficult to hold in position while fasteners are used to secure the PIA assembly to the vehicle. In some applications, there is a need to temporarily affix the wrap bracket to the vehicle while other assembly steps are performed.

This disclosure is directed to solving the above problems and other problems as summarized below.

SUMMARY

According to one aspect of this disclosure, a wrap bracket assembly is disclosed that includes a clamp and a push-on nut. The clamp includes a first attachment flange defining a first attachment opening, a second attachment flange defining a second attachment opening, and a loop portion disposed between the first attachment flange and the second attachment flange. The push-on nut defines a receptacle opening having teeth that extend radially inwardly from the receptacle opening and extend partially across the first attachment opening. The push-on nut includes an outer leg and an inner leg that are clipped to the first attachment flange in an open position. The crimp tab is bent over the second attachment flange to hold the first and second attachment flanges together in a closed position. By attaching the push nut to the wrap bracket, it can be shipped as an assembly after it has been closed and crimped on the mounting end of the wrap bracket.

According to other aspects of this disclosure, a grommet defining an opening for receiving an elongated member is provided that is assembled inside the loop portion of the clamp. A first intermediate portion may be provided between the first attachment flange and the loop portion, and a second intermediate portion may be provided between the second attachment flange and the loop portion.

The wrap bracket assembly may be oriented with the outer leg disposed on the side of the push-on nut furthest from the loop portion and the inner leg disposed on the side of the push-on nut closest to the loop portion. The spacing between the outer leg and the inner leg is slightly less than the length of the first attachment flange in the direction toward and away from the loop portion. The push-on nut is retained on the second attachment flange by the outer leg and inner leg of the push-on nut in the open position. Ramp surfaces may be provided at a distal edge the outer leg and the inner leg of the push-on nut to facilitate assembling the push-on nut to the second attachment flange by spreading the outer leg and the inner leg.

According to another aspect of this disclosure, a wrap bracket assembly is disclosed that includes a clamp and a push-on nut. The clamp includes a first attachment flange defining a first attachment opening, a second attachment flange defining a second attachment opening, and a loop portion disposed between the first attachment flange and the second attachment flange. The push-on nut defines a receptacle opening having teeth that extend radially inwardly and extend partially across the first attachment opening. The push-on nut includes at least one linking member that secures the push-on nut to the second attachment flange in an open position. The push-on nut is sandwiched between the first attachment flange and the second attachment flange in a closed position. Push-nuts have tabs in the center to grip onto bolts, rods or studs for a secure hold. They are used to keep fasteners in place during assembly and are also used as thread locks for thicker nuts.

The at least one linking member may further comprise an outer leg and an inner leg that are clipped to opposing edges of the second attachment flange. The push-on nut has a body portion extending between the outer leg and the inner leg that is bowed to exert a biasing force on the outer and inner legs to grip opposite edges of the second attachment flange.

A crimp tab may be provided on the first attachment flange that is bent over the second attachment flange in the closed position.

A grommet defining an opening for receiving an elongated member is assembled inside the loop portion of the clamp.

According to another aspect of this disclosure, a push-on nut is disclosed that comprises a body defining a receptacle opening having teeth that extend radially inwardly from the receptacle opening, the body includes an outer leg and an inner leg on opposite sides of the body. The body is adapted to be clipped to a second flange in an open position. The crimp tab is adapted to be bent over the second flange to hold the first flange and the second flange together in a closed position. The crimp tab may alternatively be clipped over the wrap bracket assembly after it has been crimped closed.

According to other aspects of this disclosure relating to the push-on nut, the spacing between the outer leg and the inner leg may be slightly less than the length of the first flange and is adapted to be retained on the first flange by the outer leg and inner leg. The push-on nut may have ramp surfaces on a distal edge of each of the outer leg and the inner leg to facilitate spreading the outer leg and the inner leg.

The above aspects of this disclosure and other aspects will be described below with reference to the attached drawings.

BRIEF DESCRIPTION OF THE DRAWINGS

FIG. 3 is an elevation view of the push-on nut taken along the line 3-3 in FIG. 2.

FIG. 4 is a top plan view of the wrap bracket assembly in a closed position.

FIG. 5 is a perspective view of a wrap bracket assembly made according to the embodiment shown in FIG. 1 in a closed position with a grommet supporting two tubes.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
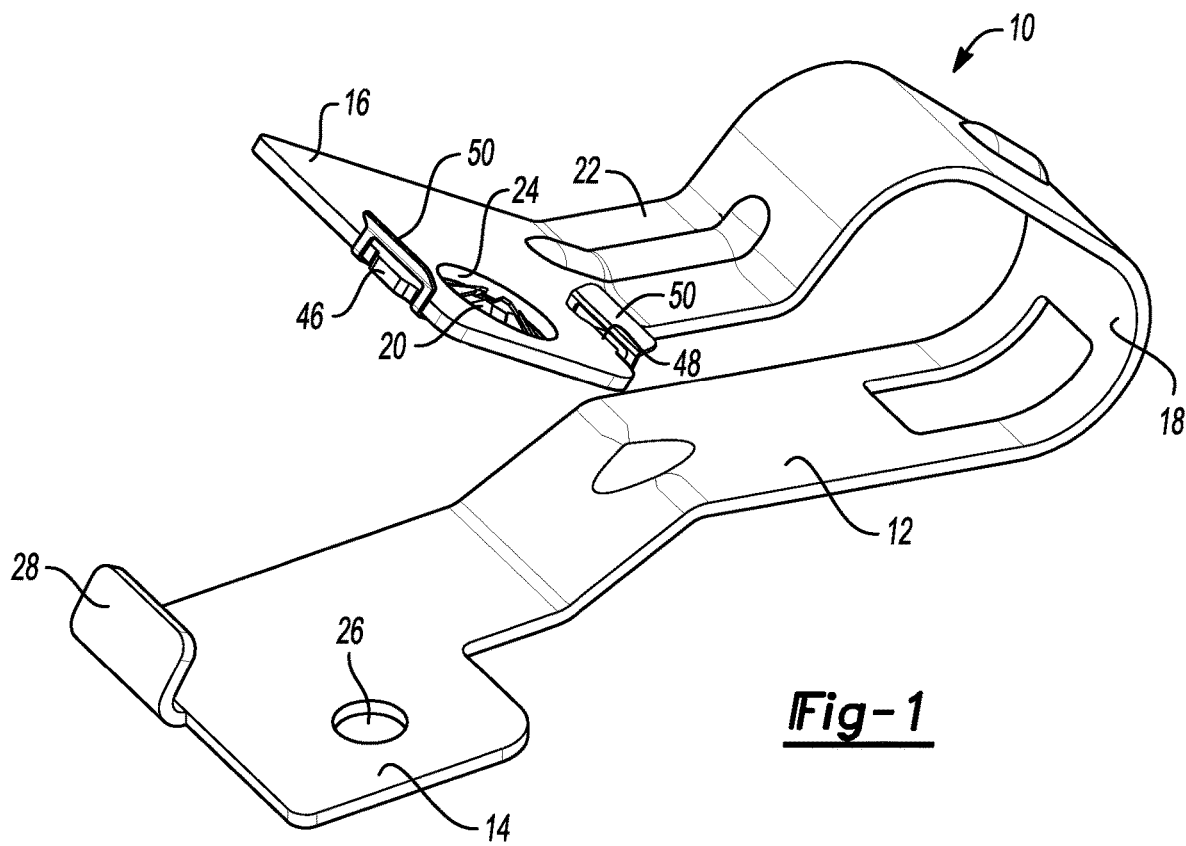
FIG. 1 is a perspective view of a wrap bracket assembly made according to one embodiment of this disclosure in an open position.

Referring to FIG. 1, a wrap bracket assembly 10 is illustrated in an open position. The wrap bracket assembly 10 includes a clamp 12. The clamp 12 has a first attachment flange 14 and a second attachment flange 16 that are connected by a loop portion 18. An intermediate portion 22 may be provided between the attachment flanges 16, 18 and the loop portion 18.

Figure 2:
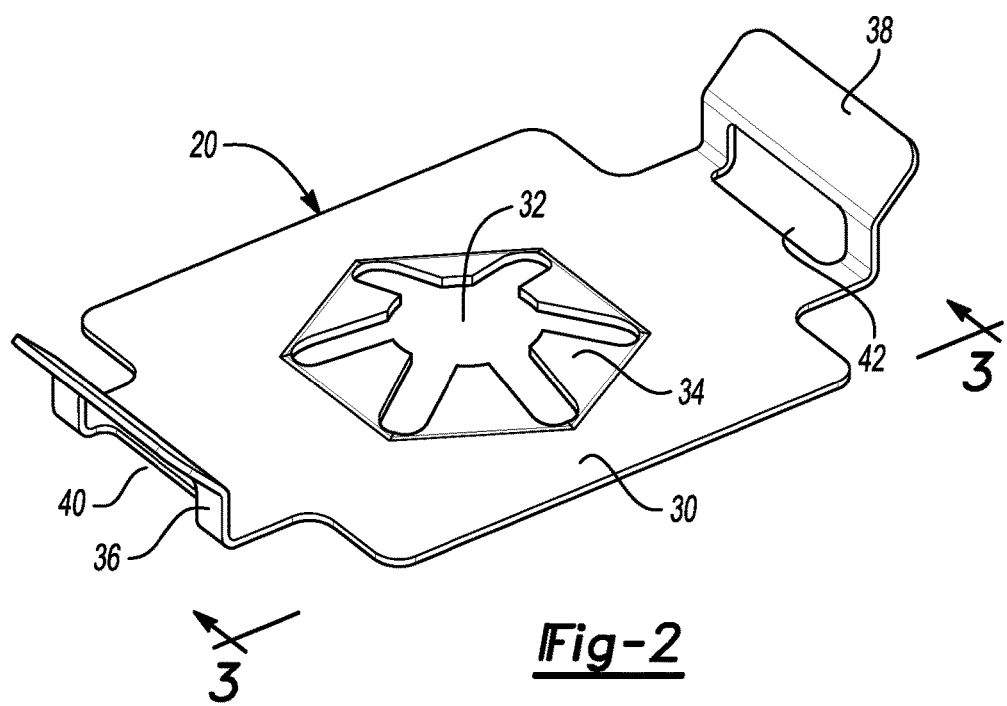
FIG. 2 is a perspective view of a push-on nut that is part of the wrap bracket assembly shown in FIG. 1.

Referring to FIGS. 1-3, a push-on nut 20 includes a body 30 defining a receptacle opening 32. As will be described with reference to FIG. 5 below, the push-on nut 20 functions to temporarily engage a protrusion such as a threaded shaft of a bolt, or the like. A plurality of teeth 34 deflect when the threaded shaft is pressed into the receptacle opening 32. The teeth 34 lock into the root of the thread.

An outer leg 36 and an inner leg 38 are provided on opposite sides of the body 30 of the push-on nut 20 with the outer leg 36 being on the side of the body 30 furthest from the loop portion 20 when assembled to the wrap bracket assembly 10. The inner leg 38 is on the side of the body 30 furthest from the loop portion 18 when assembled to the wrap bracket assembly 10. The push-on nut 20 is assembled to the second attachment flange 16 with the outer and inner legs 36, 38 contacting opposite edges of the second attachment flange 16. The body 30 may be bowed to provide a spring biasing force that urges the outer and inner legs 36, 38 toward the edges of the second attachment flange 16.

An outer slot 40 and inner slot 42 are defined by the outer leg 36 and the inner leg 38, respectively. An outer rib 46 and an inner rib 48 are provided on the opposite edges of the second attachment flange 16. The ribs 46, 48 are adapted to be received in the outer slot 40 and inner slot 42, respectively, to hold the push-on nut 20 on the second attachment flange 16.

Ramp surfaces 50 are provided on the distal ends of the legs 36, 38 to guide and facilitate assembling the push-on nut 20 to the second attachment flange 16.

Referring to FIGS. 4 and 5, the wrap bracket assembly 10 is shown in a closed position. In the closed position, the first attachment flange 14 and the second attachment flange 16 are held together by the crimp tab 28. The crimp tab 28 is formed over the second attachment flange 16 by a swiping tool after a grommet 52 and elongated tubular members 54 are inserted into the loop portion 18 of the clamp 12. The wrap bracket assembly 10 is then closed and the crimp tab 28 is bent over the second attachment flange 16.

After closing, the wrap bracket assembly 10 may be transported to an assembly line without any substantial risk of the wrap bracket assembly 10 separating. The assembly step may be performed to create a sub-assembly of the tubular members 54 and one or more wrap bracket assemblies 10.

As shown in FIG. 5, the sub-assembly is assembled to a threaded shaft 56 that is part of or attached to a support surface 58 on a vehicle. The threaded shaft 56 is inserted through the first attachment opening 24, the receptacle opening 32, and the second attachment opening 26. The wrap bracket assembly 10 and tubular members 54 may be referred to as parts-in-assembly that are held in place on the vehicle at the desired location on the support surface 58 as an assembly aid. A flange head nut 60 is tightened on the threaded shaft 56 to finish attaching the PIA including the wrap bracket assembly 10, the tubular members 54, and the grommet 52 to the support surface 58. Conversely, a bolt may be inserted in the push-on nut and tightened later at assembly.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A wrap bracket assembly comprising:
   a clamp including a first attachment flange defining a first attachment opening, a second attachment flange defining a second attachment opening, and a loop portion disposed between the first attachment flange and the second attachment flange, wherein the first attachment flange includes a crimp tab; and
   a push-on nut defining a receptacle opening having teeth that extend radially inwardly from the receptacle opening and extend partially across the first attachment opening, the push-on nut includes an outer leg and an inner leg that are clipped to the second attachment flange in an open position, the crimp tab is bent over the second attachment flange to hold the first and second attachment flanges together in a closed position.

2. The wrap bracket assembly of claim 1 further comprising:
   a grommet defining an opening for receiving an elongated member, the grommet being assembled inside the loop portion of the clamp.

3. The wrap bracket assembly of claim 1, wherein the outer leg is disposed on a side of the push-on nut furthest from the loop portion and the inner leg is disposed on a side of the push-on nut closest to the loop portion.

4. The wrap bracket assembly of claim 1, wherein the outer leg and the inner leg are spaced slightly less than a length of the first attachment flange from the inner leg in a direction toward and away from the loop portion.

5. The wrap bracket assembly of claim 1, wherein ramp surfaces are provided at a distal edge the outer leg and the inner leg of the push-on nut to facilitate assembling the push-on nut to the second attachment flange by spreading the outer leg and the inner leg.

6. The wrap bracket assembly of claim 1 further comprising:
   an outer rib and an inner rib provided on opposite edges of the second attachment flange, wherein the outer leg defines a first slot and the inner leg defines a second slot, and wherein the first slot receives the outer rib and the second slot receives the inner rib to hold the push-on nut on the second attachment flange.

7. The wrap bracket assembly of claim 1 further comprising:
 a first intermediate portion between the first attachment flange and the loop portion; and
 a second intermediate portion between the second attachment flange and the loop portion.

8. A wrap bracket assembly comprising:
 a clamp including a first attachment flange defining a first attachment opening, a second attachment flange defining a second attachment opening, and a loop portion disposed between the first attachment flange and the second attachment flange; and
 a push-on nut defining a receptacle opening having teeth that extend radially inwardly from the receptacle opening and extend partially across the first attachment opening, the push-on nut includes at least one linking member secured to the second attachment flange in an open position, wherein the push-on nut is sandwiched between the first attachment flange and the second attachment flange in a closed position.

9. The wrap bracket assembly of claim 8 wherein the at least one linking member is an outer leg and an inner leg that are clipped to opposing edges of the second attachment flange.

10. The wrap bracket assembly of claim 9 wherein the push-on nut has a body portion extending between the outer leg and the inner leg, wherein the body portion is bowed to exert a biasing force on the outer and inner legs that grips opposite edges of the second attachment flange.

11. The wrap bracket assembly of claim 9 The wrap bracket of claim 1 further comprising:
 an outer rib and an inner rib provided on opposite edges of the second attachment flange, wherein the outer leg defines a first slot and the inner leg defines a second slot, and wherein the first slot receives the outer rib and the second slot receives the inner rib to hold the push-on nut on the second attachment flange.

12. The wrap bracket assembly of claim 8 further comprising:
 a crimp tab provided on the first attachment flange that is bent over the second attachment flange in the closed position.

13. The wrap bracket assembly of claim 8 further comprising:
 a grommet defining an opening for receiving an elongated member, the grommet being assembled inside the loop portion of the clamp.

\* \* \* \* \*